Figure 4:
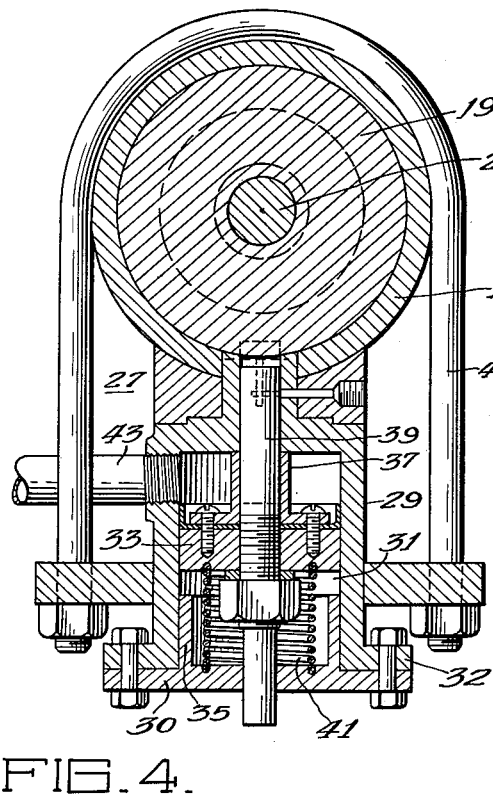

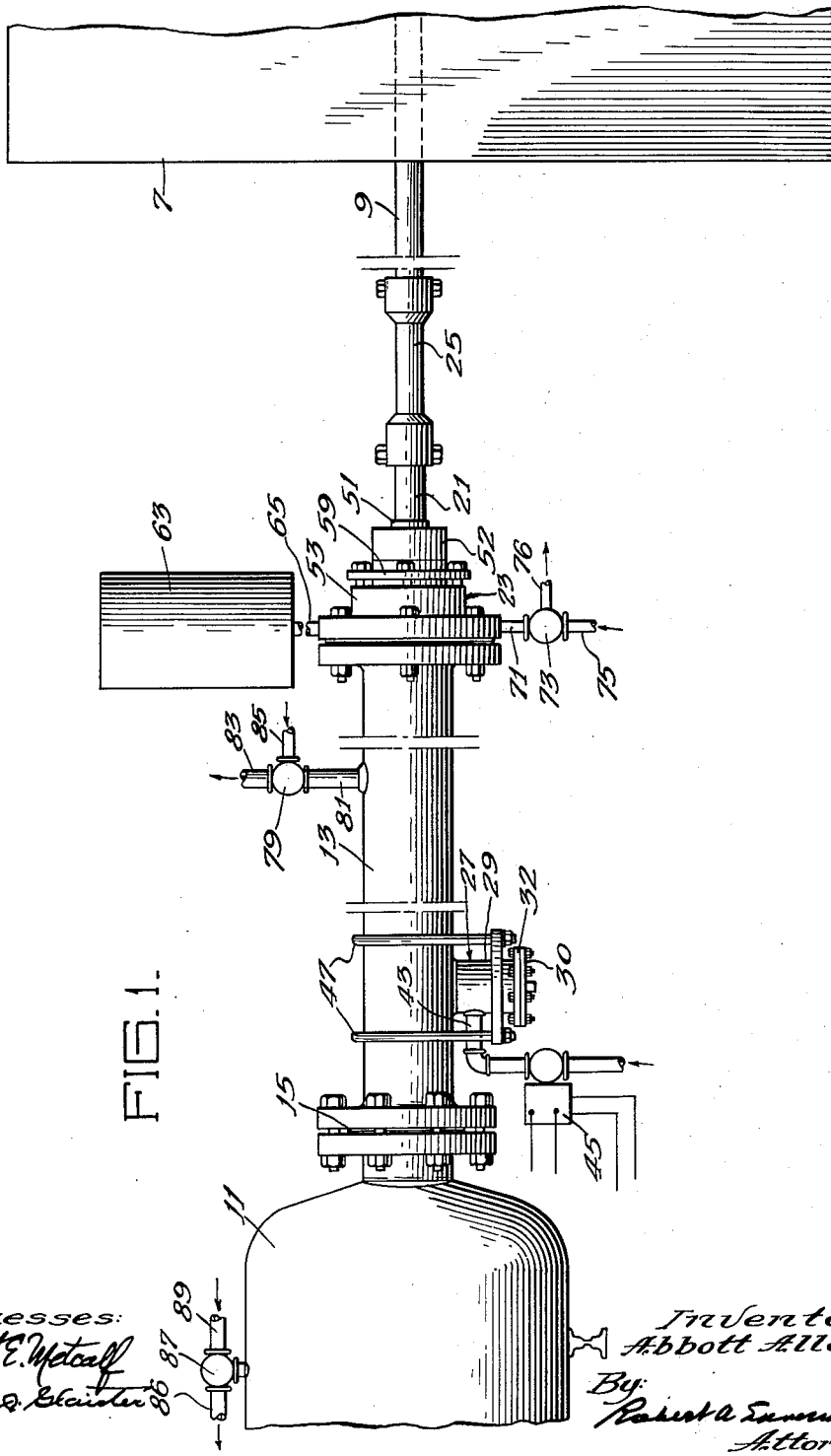

Dec. 22, 1964    A. ALLEN    3,162,578
REACTOR AND APPARATUS FOR CONTROL THEREOF
Filed March 10, 1945    3 Sheets-Sheet 2
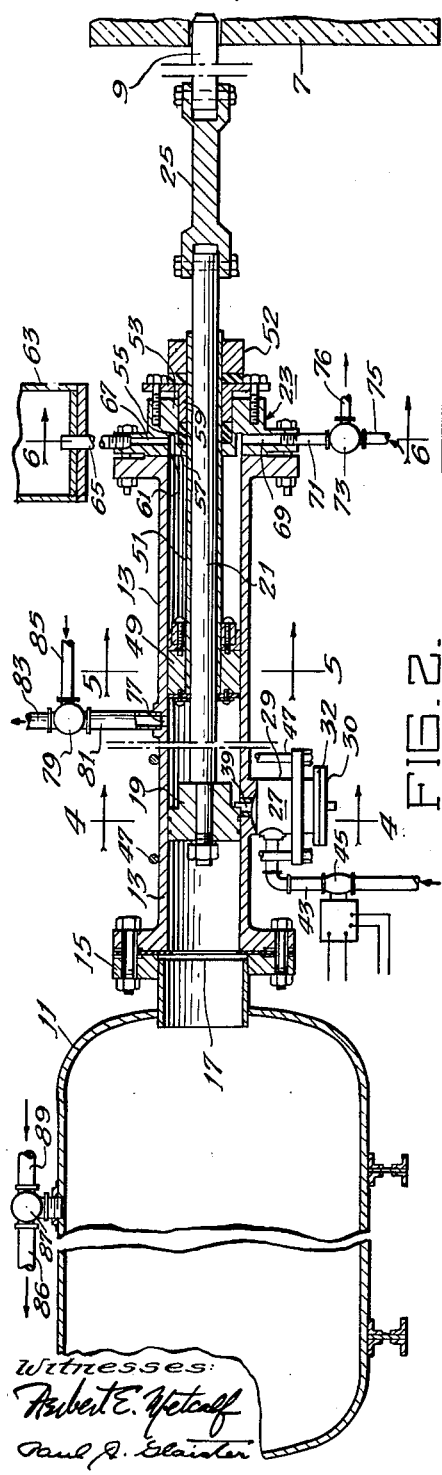
Inventor:
Abbott Allen Dec. 22, 1964  A. ALLEN  3,162,578
REACTOR AND APPARATUS FOR CONTROL THEREOF
Filed March 10, 1945  3 Sheets-Sheet 3

Witnesses:
Herbert E. Metcalf
Paul J. Glaister

Inventor:
Abbott Allen
By:
Robert C. [Attorney]
Attorney

United States Patent Office 3,162,578
Patented Dec. 22, 1964

3,162,578
REACTOR AND APPARATUS FOR
CONTROL THEREOF
Abbott Allen, Medford, Mass., assignor, by mesne assignments, to the United States of America as represented by the United States Atomic Energy Commission
Filed Mar. 10, 1945, Ser. No. 582,091
1 Claim. (Cl. 176—36)

The present invention relates to neutronic reactor systems and particularly to safety and control devices for use in connection with such systems.

A neutronic reactor system, as the term is used herein, constitutes a complete system designed for initiating and carrying out chain nuclear reactions. Such systems include a neutronic reactor wherein neutrons are developed by fission of a chain reacting material wherein such neutrons are reserved for sustaining the reaction, and control apparatus for initiating and for controlling the progress of the reaction. One type of neutronic reactor comprises a plurality of bodies of chain reacting material, such as uranium metal, arranged in a symmetrical, spatial lattice with a suitable moderating substance such as carbon, heavy water, oxygen, or beryllium occupying the interstices of the lattice. The moderating substance has the function of slowing down the fast neutrons released as an incident to the fission process, thereby making available thermal or low energy neutrons which are capable of producing further fissions and thus continuing the reaction.

In neutronic reactor systems of large capacity it has been found desirable to utilize cylindrical slugs of fissionable material and to locate those slugs within internally ribbed tubes which may be made of aluminum or other material having low neutron capture capabilities. Water or some other coolant is forced through the annular space between the slugs and the tube walls to carry away the heat developed by the reaction. The use of water for cooling the reactor slugs, while effective in rapidly removing large amounts of heat, may be accompanied by certain undesirable results. In the event that the flow of water through one of the slug containing tubes should be interfered with, the heat which is being continuously developed within the slugs of reacting material will quickly vaporize the surrounding water. This conversion of the water in the tube to steam will alter the characteristics of the reactor in such manner that the neutron reproduction factor which factor is a measure of the rate at which the chain reaction progresses, will be increased at least in the region of the clogged tube, thereby producing more heating with additional vaporization of water to further increase the neutron reproduction factor. Fusion of the particular tube involved, accompanied by an explosion due to the superheated steam may reasonably be expected. It will be apparent that this inherent characteristic of liquid cooled neutron reactors constitutes a serious danger and it is highly important to the operation of these devices that they be provided with means for preventing any such runaway action.

The operation of a neutronic reactor may be interrupted substantially instantaneously by the introduction into the reactor of a member of material having high neutron capture capabilities as, for example, cadmium or boron. This material effects an immediate decrease in the neutron reproduction ratio of the reactor as a whole because of neutron absorption and if a sufficient quantity is used, the reproduction ratio will decrease to a figure below unity thereby terminating the chain reaction. The rapid rate at which the neutron reproduction factor increases in the event of the interruption of liquid flow through one of the slug containing tubes, as described above, makes it necessary that the control device shall be moved into the reactor at extremely high speed if damage to the reactor is to be prevented. For example, in certain existing reactor designs, it is desirable to move a fabricated control rod which is approximately 36 feet long from a normal position completely outside the reactor to a position where substantially the entire length of the control rod is within the reactor in less than one second. Further, in order to avoid mechanical damage to the reactor structure, the control rod must be smoothly decelerated as it approaches the desired position within the reactor and stopped at the proper place.

The present invention is concerned with operating mechanisms for control rods of this type, and has for its principal object the provision of a simple and reliable control rod operating mechanism which is capable of moving a heavy, elongated control rod into a neutronic reactor upon the occurrence of predetermined abnormal conditions in the minimum possible time and which, in addition, is automatically operable to smoothly decelerate and stop the rod when it reaches the desired control position within the reactor.

Figure 6:
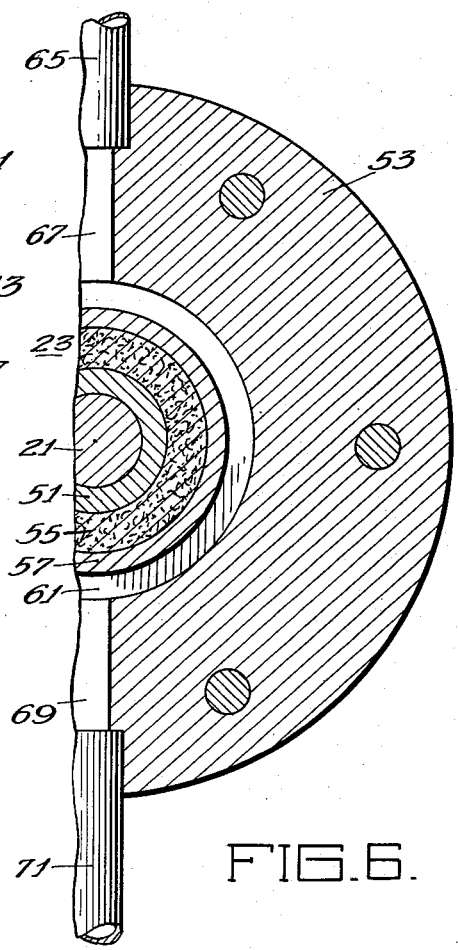
Figure 5:
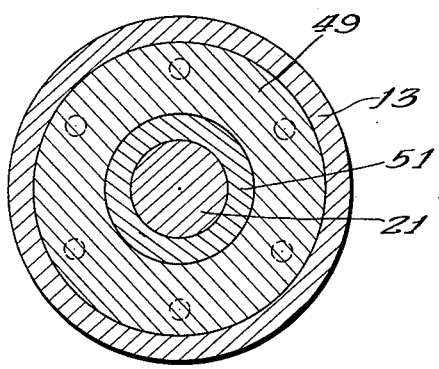

The various novel constructional features and combinations which contribute to the successful operation of the apparatus of the invention, and a more complete exposition of its principles and mode of operation will be found in the following description and the accompanying drawings of one preferred embodiment thereof. In the drawings, FIG. 1 is a side elevational view showing the general features of the device;

FIG. 2 is a sectional view of the apparatus shown in elevation in FIG. 1 with the control rod in the normal or retracted position;

FIG. 3 is a sectional view similar to FIG. 2 showing the apparatus in the extended or operating position; and FIGS. 4, 5, and 6 are enlarged, sectional views on the general lines 4—4, 5—5, and 6—6, respectively, of FIG. 2.

In the drawings, a neutronic reactor is generally indicated at 7. This may comprise a liquid cooled reactor, that being the type to which the present invention particularly pertains, or it may be of some other design, since the control rod operating mechanism of the present invention can be used in conjunction with reactors of all known types. A control rod 9 which may comprise a fabricated tube containing substantial quantities of cadmium or boron or other material having high neutron capture capabilities is supported upon suitable guide means, not shown, for movement into and out of the reactor 7. The particular design of the control rod 9 and the guide suport therefore are not important parts of the present invention; it is necessary merely that the rod shall move freely into and out of the reactor, and that its neutron capture capabilities be such that termination of the reaction will result when the rod is within the reactor.

The control rod operating mechanism illustrated is of the pneumatic type and includes a source of fluid pressure, which conveniently comprises a large tank or reservoir 11 containing compressed air. The tank 11 communicates with the rearward end of an elongated cylinder 13 through a flange connection 15 having an opening 17 which is desirably of at least the same cross sectional area as the cylinder 13, in order to obtain unthrottled transmission of fluid pressure from the tank 11 to the cylinder 13.

The control rod 9 is moved into the reactor 7 by means of a main operating piston 19 adapted to move in the elongated cylinder 13. The piston 19 is mechanically connected to the control rod 9 by a cylindrical pusher rod 21, which extends through a gland seal 23 provided at the forward end of the cylinder 13, and an insulating connection 25, which prevents heat transfer from the control rod 9 to the pusher rod 21.

The piston 19, the pusher rod 21, and the control rod 9 together comprise a unit assembly which is normally held in the retracted position shown in FIGS. 1 and 2 against the biasing action of the pressure air contained in the reservoir 11 by a releasable latch mechanism 27. The latch mechanism 27 may be pneumatically or electrically operated, and the details of a suitable pneumatically operated type are shown in FIG. 4. The illustrated structure includes a body 29 which serves to define the walls of a cylinder 31. The cylinder 31 is closed at its lower end by a cover plate 30 bolted to a flange 32 integral with the cylinder body 29. A piston 33 is located within the cylinder 31 and is movable between limits defined by an annular stop 35 located in the base of the cylinder 31 and a tubular stop 37 affixed to the upper end of the piston itself. A latch member 39 is bolted to the piston 33, as illustrated in FIG. 4, and is adapted to engage and latch the main operating piston 19 when that member is in the retracted position, as previously described.

The latch member 39 and the latch operating piston 33 are biased to the latched position by a compression spring 41, and the upper end of the cylinder 31 is provided with an air connection 43 through which compressed air may be admitted to the upper face of the piston 33 to accomplish the release of the latch. The air connection 43 is connected to a source of compressed air through an electrically operated valve 45, whereby release of the latch may be accomplished upon the occurrence of predetermined conditions. The entire latch mechanism 27 is mounted on the main cylinder 13 by U-shaped tie bolts 47 as shown.

As previously stated, the control rod 9 for a liquid cooled reactor of large power capacity may have a length of the order of 30 to 40 feet, and since the control rod 9 must be withdrawn from the reactor 7 during normal operation thereof, the cylinder 13 and the pusher rod 21 must be of comparable length. This results in the assembly of moving parts which comprises the piston 19, the pusher rod 21, and the control rod 9, having very substantial weight. Despite this, it is essential that the piston, pusher rod, and control rod shall be moved with the maximum possible acceleration upon the release of the latch 27 so as to get the control rod 9 into the reactor as quickly as possible, and it is equally important that the piston, pusher rod, and control rod shall be smoothly decelerated and stopped as soon as the control rod 9 reaches the desired extended position within the reactor 7.

The attainment of the desired initial acceleration and rapid movement of the control rod 9 is accomplished by continuously biasing the piston 19 to the extended position and by the use of a large capacity source of fluid pressure which is connected to the piston 19 and cylinder 13 through the large opening 17 which prevents throttling as the piston 19 advances.

The desired smooth deceleration and stopping of the piston, pusher rod, and control rod assembly is attained by the use of a pneumatic decelerating means which includes a second piston 49 movable in the main cylinder 13 ahead of the control rod operating piston 19 and vent means so arranged that air is entrapped between the two pistons 19 and 49 ahead of the decelerating piston 49 during each operation of the apparatus. This combination effects smooth and rapid deceleration and stopping of the entire assembly of moving parts and has proven most advantageous.

The decelerated piston 49 is supported upon a tubular guide 51 which engages the pusher rod 21 with a bearing fit and which extends through the gland structure 23 provided at the forward end of the cylinder 13. The tubular guide 51 includes an annular stop 52 which limits rearward motion of the guide 51 and the decelerating piston 49. The gland structure 23 is of conventional design and comprises an annular base or flange 53 bolted to the forward end of the piston 13, packing 55 supported in a suitable groove 57 formed at the inner surface of the base 53, and a flanged compression ring 59 arranged to be pressed against the packing 55 by means of cap screws in the conventional manner.

The base 53 of the gland structure is provided with an internal groove 61 shown particularly in FIG. 6 which is utilized to provide a vent connection between the forward end of the cylinder 13 and a closed expansion chamber 63 which is connected to the groove 61 by suitable piping 65 and a passageway 67 as illustrated. A second vent connection is provided to the groove 61 diametrically opposite the connection to the expansion tank 63 by means of a second drilled passageway 69 and conduit 71. The conduit 71 connects with a three-way valve 73 which in one position connects with a source of pressure air through a conduit 75. In one of its other two positions, the valve 73 is closed, and in the third position it vents the conduit 71 to the atmosphere through a conduit 77. A third vent opening 77 is provided at the forward end of the cylinder 13. The opening 77 is located a short distance to the rear of the position occupied by the decelerating piston 49 when that piston is in the fully retracted position and it is connected to a two-way valve 79 by a conduit 81. The valve 79 is operable to vent the opening 77 to the atmosphere through the conduit 83 or to connect the opening 77 to a source of pressure air through the conduit 85.

When the reactor system is operating normally the various parts of the apparatus will be in the retracted position shown in FIGS. 1 and 2. The main operating piston 19 and with it the pusher rod 21 and the control rod 9 will be biased toward the reactor 7 by the fluid pressure of the air or other medium contained in the pressure tank 11 and will be held in the retracted position by the automatic latch mechanism 27. The valve 73 will be in position to close the vent opening provided by the passageway 69 at the forward end of the cylinder 13 and the valve 79 will be in position to vent the opening 77 which is rearward of the decelerating piston 49 and between that piston and the main operating piston 19. The expansion tank 63 which is unvented is connected to the forward end of the cylinder 19 through the conduit 65 and the passageway 67.

Upon the occurrence of predetermined conditions, such as a stoppage of water flow through one of the tubes containing the reacting metal slugs, the electrically operated valve 45 may be actuated (by means not illustrated), compressed air will be admitted to the cylinder 31 of the releasable latch mechanism 27 and the latch piston 33 will be moved to release the latch member 37 holding the main operating piston 19 in retracted position. The piston 19 together with the pusher rod 21 will then be moved under the full pressure of the compressed air contained in the reservoir 11 so as to move the control rod 9 into the reactor at very high speed. Since the vent opening 77 ahead of the main piston is open, there will be no substantial entrapment of air or impediment to the free forward movement of the main operating piston 19 until the piston 19 passes this vent opening. In the particular structure illustrated in the drawings, the vent opening 77 will not be reached until the piston 19 has travelled about 36 feet into the reactor at which point the control rod 9 is well beyond the point at which it is effective to extinguish the reaction.

As soon as the main piston 19 passes the vent opening 77, air will be entrapped between the piston 19 and the decelerating piston 49, and since all vents at the forward end of the cylinder 13 are also closed, there will be a further entrapment of air ahead of the decelerating piston 49. Due to the additional volume provided by the expansion chamber 63 ahead of the decelerating piston 49, a progressive cushioning effect will be obtained, with the result that the complete moving structure will be smoothly decelerated and brought to a stop within a distance of about 4 to 5 feet. In the structure illustrated, as soon as the forward motion of the piston, pusher rod, and control rod assembly has stopped, a readjustment of the pressures will occur, the decelerating piston 49 will be slowly returned substantially to its normal position with the stop 52 abutting against the gland structure 23, and the main piston 19 will be returned to a point adjacent the normally open vent 77. There is therefore a slight overshooting as the control rod 9 is moved into the reactor, but since the desired result is to get a sufficient length of the rod 9 into the reactor to effect extinguishment of the reaction before damage has occurred, this overshooting is of no serious importance.

Following each operation of the device, which will usually constitute an emergency shutdown of the reactor 7, it is probable that the control rod 9 will be left in the reactor 7 for some time. This being the case, the main pressure tank 11 will be vented through a conduit 86 by operation of a three-way valve 87. When it is desired at some later time to effect withdrawal of the control rod 9, the valve 73 will be operated to admit pressure air to the forward end of the cylinder 13. This will positively move the decelerating piston 49 rearwardly until the stop 52 abuts against the gland structure 23 and at the same time will move the main operating piston rearward of the opening 77. Compressed air will now be admitted to the cylinder 13 through the opening 77, which is now forward of the main piston 19, by operation of the valve 79. The pressure tank 11 should be vented at this time. The compressed air admitted through the opening 77 will move the piston, pusher rod and control rod assembly to the retracted position in which position the main operating piston will be latched against forward movement by the releasable latch mechanism 27. The valve 79 should then be moved to vent position and left in that position. Next the valve 73 will be operated to vent position to reduce the pressure at the forward end of the cylinder 13 to atmospheric pressure and then closed. Finally compressed air will be admitted to the pressure tank 11 through conduit 89, by operation of the valve 87, and as soon as that tank is brought to the desired pressure level, the valve 89 may be closed. The apparatus will then be restored to operating condition. If desired, interlocks or indicators can be provided to assure that all valves are in proper position.

In the foregoing, I have disclosed the features of a new and improved control rod operating mechanism for use in connection with a neutronic reactor. The apparatus while simple in design is reliable in operation and is effective to accomplish extremely rapid acceleration of relatively heavy control rod structures. At the same time the apparatus is operable to effect smooth and rapid deceleration of the control rod when it has reached its operating position. The features of the invention which I believe to be new are expressly pointed out in the appended claim.

What is claimed is:

A control rod for use in a nuclear reactor comprising an elongated member of a material having high neutron capture capabilities and operating means for said control rod actuable to move said control rod at high speed, said operating means comprising an elongated cylinder having a gland outlet at one end thereof, a source of fluid pressure including a reservoir of large capacity containing compressed air attached to the end of the cylinder opposite the gland, a piston slidably mounted in the cylinder and a pusher rod mechanically connecting said piston to said control rod and adapted to pass through said gland outlet, said piston and rod being normally biased to an extended control position by fluid pressure from said source, a releasable latch mounted upon the cylinder and positioned to restrain the control rod in a retracted position, piston decelerating means comprising a vent in the cylinder disposed between the retracted and extended positions of the rod operating piston, means connecting the vent to a source of high-pressure air and to the atmosphere, a second piston surrounding said pusher rod and independently movable within said cylinder ahead of said rod operating piston, said second piston having a tubular extension surrounding said pusher rod extending through said gland outlet, stop means associated with said extension for restraining the movement of said second piston forward of said vent, a closed pressure chamber connected to said cylinder at a point ahead of said second piston, a vent in the cylinder disposed ahead of the second piston, and means connecting the vent to the atmosphere and to a source of high-pressure air.

References Cited by the Examiner
UNITED STATES PATENTS

| 2,461 | 1/67 | James | 121—38 |
| 174,571 | 3/76 | Randall | 236—100 |
| 373,324 | 11/87 | Wheeler | 236—100 |
| 795,024 | 7/05 | Case | 121—38 |
| 1,102,271 | 7/14 | Hunter | 121—31 |
| 1,515,173 | 11/24 | Roucka | 137—139 |
| 1,824,457 | 9/31 | Barlow | 121 |
| 2,206,634 | 7/40 | Fermi et al. | 204—154.2 |
| 2,342,816 | 2/44 | Peek | 74—2 |
| 2,391,676 | 12/45 | Browning | 121—38 |
| 2,708,656 | 5/55 | Fermi et al. | 204—193.2 |

FOREIGN PATENTS 233,011 10/44 Switzerland.

CARL D. QUARFORTH, *Primary Examiner.*

REUBEN EPSTEIN, LEON D. ROSDOL, JAMES L. BREWRINK, SAMUEL COCKERILL, *Examiners.*